Figure 1:
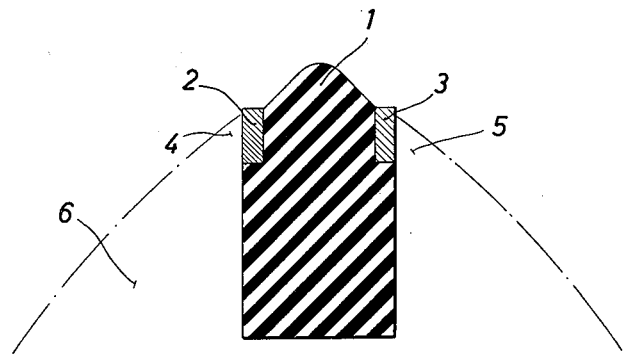

Inventor
ERNST FUHRMANN

3,194,488
SEALING BAR FOR ROTATING PISTON ENGINES

Ernst Fuhrmann, Burscheid, near Cologne, Germany, assignor to Goetzewerke Friedrich Goetze Aktiengesellschaft, Burscheid, near Cologne, Germany, a corporation of Germany
Filed Sept. 9, 1963, Ser. No. 307,727
Claims priority, application Germany, Sept. 10, 1962,
G 35,892
3 Claims. (Cl. 230—145)

The invention disclosed herein is concerned with a sealing bar for rotating piston engines, which bar is made of non-metallic material and a metallic carrier.

It is known to use in rotating piston engines, for the sealing of a piston, sealing bars which are seated radially movably in grooves formed in the piston. Radially acting springs hold the respective sealing bars in continuous engagement with the inner wall of the enveloping body or cylinder. It was found that the weight of the sealing bar has especially in the case of high speed piston rotation, a relatively great influence so far as the sealing action and formation of chatter marks on the inner wall of the piston-enveloping body, are concerned. Attempts at reducing the chatter marks by the use of auxiliary elements built into the structure were not successful.

It was also proposed to reduce the weight of the sealing bar by making the bar cross-sectionally U-shaped with the open profile facing the base of the respective piston groove. According to another proposal, the bar was to be made of light metal with a hardened wear-resistant material inserted therein to form the cylinder wall-engaging part.

The invention is based upon recognition of the fact that non-metallic materials are adapted for the sealing of rotating piston engines, provided that they are sufficiently secured against breakage.

It is already known to make the sealing bar of two different materials, whereby the part adjacent the cylinder wall-engaging part is formed of a material with high damping characteristic. Coutchouc or synthetic resin intermixed with copper, graphite, or similar material was used for this purpose. Such a highly elastic sealing bar is on the back thereof embraced by a metallic carrier, so that the flanks of the respective piston groove were engaged by the elastic material as well as by the carrier material, thereby making it possible that the elastic material acted in damping manner on the bar.

According to the invention, the sealing bar which is made of synthetic carbon or plastic material with a filling substance, is embraced by a metallic carrier at least at its upper flank portions lying adjacent the cylinder wall-engaging part thereof. It is thereby with great certainty avoided that the bar, which is sensitive to breakage, hits against and is damaged by the corners of the groove formed by the groove flanks and the piston periphery. It has been found in practical operation that these corners cause great wear of the sealing bars. Accordingly, it is in connection with the invention of particular importance that this area of the sealing bar, which corresponds in operation with the edge referred to, is metallically protected. Graphite or molybdenum sulphide, asbestos fibers or glass fibers, may be respectively or in combination used as filler substances for the bar made of plastic or synthetic material. It is likewise feasible to build into the bar a fabric, webbing or the like.

The cylinder wall-engaging portion of the sealing bar extends progressively in dome shape from the embracing carrier part. The dome shaped portion will be in engagement with the enveloping body at any instant of the piston motion. The corresponding portion may also be cone shaped with the apex thereof slightly rounded.

A simple carrier for the sealing bar may be formed by a cross-sectional U-shaped member the legs of which extend up to the cylinder engaging part of the bar. Another way of forming the carrier for the bar resides in forming the latter with interruptions, and casting a light metal about such bar, and subsequently machining and suitably hardening the light metal flanks. The individual parts may also be inseparably joined by cementing.

It is advantageous to extend the metallic carrier material into the cylinder engaging part of the bar so as to avoid chipping of the bar material.

Further details of the invention will become apparent from the description of embodiments rendered below with reference to the accompanying drawing.

Figure 2:
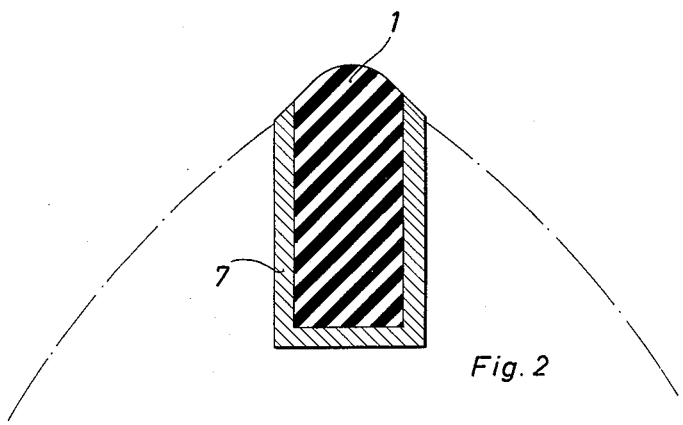
Figure 3:
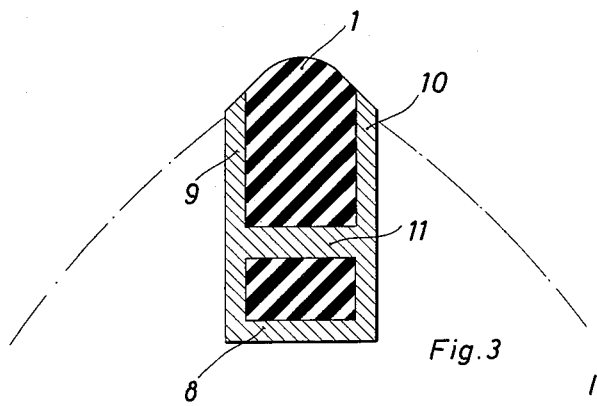

FIG. 1 shows in cross-sectional representation one embodiment, FIG. 2 shows in similar representation another embodiment, and FIG. 3 shows in like manner still another embodiment.

In FIG. 1, the sealing bar 1 is made of carbon and the flanks thereof are supported by metallic members 2 and 3. These members are disposed merely in the upper areas of the sealing bar 1 so as to avoid hitting of the edges of the piston in the regions 4 and 5, by the bar.

In the embodiment according to FIG. 2, the sealing bar is embraced by a cross-sectionally U-shaped holder or carrier 7 the legs of which extend smoothly up to and partially into the cylinder-engaging bar portion, the two parts being joined by cementing. It may be mentioned at this point that the cementing together of the parts may be applied in each embodiment.

In the embodiment shown in FIG. 3, the sealing bar 1 is protected by an enveloping body 8 which is cast or molded thereabout. The two legs 9 and 10 of the body 8 are interconnected by a transverse web 11, the sealing bar 1 and the carrier body 8 thus forming an inseparable unit.

Changes may be made within the scope and spirit of the appended claims which define what is believed to be new and desired to have protected by Letters Patent.

I claim:
1. In combination with the piston of a rotating piston engine which piston is mounted for eccentric rotation relative to a piston enveloping body, said piston being provided with outwardly facing grooves running from one end face to the other of said piston for respectively receiving a sealing bar extending the length of said groove with parts of the free end thereof emerging from the respective grooves for sealing engagement with the inner wall of said piston enveloping body, the respective sealing bars having a body which is made of non-metallic material, and metallic sheathing means provided about the sides of the body within the groove, said metallic sheathing means projecting slightly beyond the edges of the groove at all times during operation of the device and the body emerging from said sheathing and tapering progressively from the inner terminal edge of said sheathing to form a dome-shaped cylinder-engaging surface, and said sheathing in cross section being generally U-shaped and conforming to the cross sectional configuration of said body and covering the base and sides, and the edges of said sheathing adjacent to said surface being tapered in a like manner and conforming to said surface and forming a part thereof.

2. The combination defined in claim 1, wherein said cross-sectionally U-shaped sheathing is provided with a transverse web extending through part of said body and interconnecting the legs of said sheathing.

3. The combination defined in claim 1, wherein said body has at least one transverse opening formed therein, said cross-sectionally U-shaped sheathing being provided with a transverse web extending through said opening and interconnecting the legs of said sheathing, whereby said sheathing is inseparably secured to said body and forms a unitary structure therewith.

References Cited by the Examiner

UNITED STATES PATENTS

| | | | |
|---|---|---|---|
| 959,049 | 5/10 | Boland | 230—152 |
| 1,539,728 | 5/25 | Ensign | 230—152 |
| 2,491,100 | 12/49 | Frei | 230—152 |
| 2,493,148 | 1/50 | Kiekhaefer | 103—132 |
| 2,604,052 | 7/52 | Eickele | 103—117 |
| 2,625,885 | 1/53 | Mumma | 103—117 |
| 2,818,024 | 12/57 | Herschel | 103—136 |
| 2,969,171 | 1/61 | Venediger | 230—152 |
| 2,974,603 | 3/61 | Fraser | 103—117 |
| 3,044,687 | 7/62 | Davey | 230—152 |

FOREIGN PATENTS 565,447  11/44  Great Britain.

KARL J. ALBRECHT, *Primary Examiner.*

WILBUR J. GOODLIN, JOSEPH H. BRANSON, JR., *Examiners.*